United States Patent [19]

Jane et al.

[11] Patent Number: 5,710,190
[45] Date of Patent: Jan. 20, 1998

[54] SOY PROTEIN-BASED THERMOPLASTIC COMPOSITION FOR FOAMED ARTICLES

[75] Inventors: Jay-lin Jane; Su She Zhang, both of Ames, Iowa

[73] Assignee: Iowa State University Research Foundation, Inc., Ames, Iowa

[21] Appl. No.: 487,047

[22] Filed: Jun. 7, 1995

[51] Int. Cl.$^6$ .................. C08J 9/06; C08J 9/08; C08J 9/10; C08K 5/24

[52] U.S. Cl. .......... 521/102; 426/440; 426/442; 426/445; 426/564; 426/656; 521/84.1; 521/88; 521/92; 521/94; 521/95; 521/97; 521/109.1; 521/116; 521/117; 521/118; 521/121; 521/125; 521/128; 521/130; 521/134; 521/151; 521/120

[58] Field of Search ............... 521/84.1, 88, 92, 521/94, 95, 97, 102, 109.1, 116, 117, 118, 125, 128, 130, 134, 151, 120; 426/564, 656, 440, 442, 445

[56] References Cited

U.S. PATENT DOCUMENTS

| | | | |
|---|---|---|---|
| 3,310,446 | 3/1967 | Georgavits | 156/198 |
| 3,615,715 | 10/1971 | Mullen | 106/124 |
| 3,662,673 | 5/1972 | Boyer et al. | 99/17 |
| 3,682,661 | 8/1972 | Turbak | 99/176 |
| 3,965,268 | 6/1976 | Stocker et al. | 426/331 |
| 3,978,236 | 8/1976 | Sair et al. | 426/445 |
| 4,185,146 | 1/1980 | Burke | 521/99 |
| 4,463,039 | 7/1984 | O'Connell et al. | 521/68 |
| 4,504,602 | 3/1985 | O'Connell et al. | 521/68 |
| 4,738,817 | 4/1988 | Wittwer et al. | 106/135 |
| 4,861,603 | 8/1989 | Saito et al. | 426/93 |
| 5,266,368 | 11/1993 | Miller | 521/84.1 |
| 5,317,037 | 5/1994 | Golden et al. | 523/128 |
| 5,321,064 | 6/1994 | Vaidya et al. | 524/56 |
| 5,342,635 | 8/1994 | Schwab et al. | 426/241 |
| 5,371,194 | 12/1994 | Ferretti | 521/63 |

*Primary Examiner*—Rabon Sergent
*Attorney, Agent, or Firm*—Merchant, Gould, Smith, Edell, Welter and Schmidt, P.A.

[57] ABSTRACT

The invention provides a biodegradable thermoplastic composition made of soy protein, a plasticizing agent, a foaming agent, and water, that can be molded into biodegradable articles that have a foamed structure and are water-resistant with a high level of physical strength and/or thermal insulating properties.

18 Claims, No Drawings

SOY PROTEIN-BASED THERMOPLASTIC COMPOSITION FOR FOAMED ARTICLES

BACKGROUND OF THE INVENTION

Foam materials are used for a broad range of consumer applications including insulation, impact-resistant packaging, and acoustic lay-in ceiling tile. Conventional foams are made from petroleum-based materials such as polystyrene and polyurethane. Although such materials are light weight and are good insulators, they are not biodegradable and their use contributes to the problem of solid waste disposal. In addition, polyurethane products are expensive to make and are not economically competitive for everyday consumer articles such as a packaging and packing material.

Articles formed from renewable, biodegradable agricultural materials are becoming increasingly popular with environmentally aware consumers. Such materials are needed to replace existing nonbiodegradable, synthetic foam articles. However, although articles made of various types of proteinaceous material such as soy isolates and concentrates have been described, soy protein is not known for making expanded foam material.

Therefore, an object of the invention is to develop a biodegradable composition from a soy protein-based thermoplastic composition or other agriculturally-based biopolymer, that can be processed into a solid, foamed packaging container or other like materials. Another object is to provide a thermoplastic material made of soy protein that possesses a flowability for processing the material into a molded, solid foamed plastic article by extrusion, injection molding, and/or other molding process, that has a high level of tensile strength, elongation and/or water-resistance being capable of tolerating exposure to water over an extended period of time with minimal or no disintegration. Yet another object is to provide a foamed article formed from a soy protein-based thermoplastic that has good insulating properties. Another object is to provide a low-cost biodegradable plastic for use in making foamed articles.

SUMMARY OF THE INVENTION

These and other objects are achieved by the present invention which is directed to a biodegradable, soy protein-based thermoplastic composition. The composition is made of soy protein combined with a foaming agent, an organic plasticizing agent, and an aqueous medium such as water, and additives as desired. Articles formed from the composition have a foamed, cellular structure, and are biodegradable and possess a high degree of tensile strength, low density, and water resistance. Also provided are methods of preparing the composition and forming an article from the composition.

The composition is composed of about 100 parts soy protein that is preferably soy protein isolate, of which a portion can be replaced with another protein (about 5–50 parts) such as gluten, zein or other plant protein, and about 0.1–10 parts of a foaming agent, preferably 1–5 parts, which is preferably 4,4'-oxybis(benzenesulfonylhydrazide) or p-toluenesulfonylhydrazide, about 5–60 parts of an organic plasticizing agent that is preferably glycerol, ethylene glycol or propylene glycol, and about 5–50 parts aqueous medium which is preferably water. One or more additives such as a filler, lubricant, colorant, preservative, and bleaching/whitening agent, can be included as desired.

The thermoplastic compositions are prepared by mixing together the soy protein, foaming agent, plasticizing agent, and a low amount of aqueous medium (about 5–25%) at about room temperature to form a semi-powdered mixture. The mixture can be directly molded into an article by compression molding at an about 5–25% moisture content. The same thermoplastic composition with an about 30–50% moisture content can be extruded at about 80°–100° C. to produce pellets. The pellets can be dried at about 50° C. to an about 25–30% moisture content, and used for making extruded foam sheets and thermoformed into various shapes at a temperature of about 85°–100° C.

Advantageously, the protein-based thermoplastics of the invention are biodegradable, and are suitable for use in making articles that are disposable, as for example food containers, plates, bowls, and the like. The composition is also useful for making lightweight, thermal insulation material such as clam-shell containers, structured foam-packaging material, loose-fill packing peanuts, building insulation material, and the like. Articles formed from the material have demonstrated excellent biodegradability and water resistance in that the article in contact with water will absorb water and expand but not readily dissolve. The articles can also be reused as a soil conditioner. The soy protein-based material can also be produced at a low cost that is competitive with common petroleum-based plastics.

DETAILED DESCRIPTION OF THE INVENTION

The thermoplastic composition of the present invention is composed of the reaction product of a major amount of soy protein combined with a foaming agent, plasticizer, and water or other suitable aqueous medium, and additives as desired. Preparation of the composition is in a mixer at about room temperature to form a homogeneous powdered mixture that can then be directly molded into an article. The molded articles are a foam or cellular plastic that is flexible or rigid depending on the amount of plasticizer in the mixture. In a preferred embodiment, the foamed articles have a closed cell structure to provide a high degree of thermal insulation.

As used herein, unless otherwise noted, the term "parts" of an ingredient means parts by weight, and are based upon 100 parts of soy protein (dry weight).

Soy Protein. The composition is formulated with about 100 parts soy protein, although part of the soy protein can be replaced by a non-soy protein. The soy protein can be in the form of a soy isolate containing at least about 90% protein, a soy protein concentrate containing at least about 70% protein, or soy flour containing at least about 50% protein. The soy protein isolate or concentrate can be prepared, for example, by alkaline extraction of a defatted meal and acid precipitation, a technique known and used in the art. Soy protein is also commercially available, for example, as Promine R (Central Soya) which is a soy isolate having a protein content of approximately 95 wt-%. Other soy protein products are also available from ADM, Decatur, Ill., and Protein Technology, St. Louis, Mo.

Foaming Agent. The foaming agent can be any one of many organic or inorganic foaming agents, or a combination of foaming agents, that is a compatible substance capable of producing a foam. The composition includes about 0.1–10 parts foaming agent, preferably about 1–8 parts, preferably about 4–5 parts.

The foaming agent imparts the molded articles with a foamed structure similar to styrofoam. The foaming agent can decompose when heated to evolve a gas such as nitrogen or carbon dioxide that is suspended in small globules in the mixture. Examples of such foaming agents include sodium bicarbonate or ammonium carbonate, a sulfonylhydrazide or related compound, an azodicarboxylic acid derivative, urea derivative, and the like. The foaming agent can also produce a foam by vaporizing or expanding. Such foaming agents include, for example, water and pentane.

Examples of suitable foaming agents include a sulfonylhydrazide such as benzosulfonylhydrazide, p-toluenesulfonylhydrazide, 4,4'-oxybis(benzenesulfonylhydrazide), bis(hydrozosulfonyl)benzene, 4,4'-bis(hydrozosulfonyl)biphenylhydrazide, diphenylsulfone-3,3-disulfonylhydrazide, and the like; an azo or diazo compound such as 2,2'-azobis(isobutyronitrile), 1,1'azobis(cyclohexylcyanide), 2,2'-diethoxy-2,2'-azopropane, azodicarboxamide, diazoaminobenzene, and the like; a nitroso compound, such as N,N'-dinitrosopentamethylenetetramine, N,N'-dimethyl-N,N'-dinitrosoterephthalamide, and the like; an organic acid azide such as terephthalazide, diphenyl-4,4'-disulfazide, and the like; an azole compound such as N-hydroxybenzotriazole, 5-amino-4-mercapto-1,2,3-(2H)triazole, and the like; urea or urea derivative such as urea-biuret, urea oxalate, nitrourea, methylaminonitrourea, and the like; and a carbonate such as ammonium carbonate, calcium carbonate, sodium carbonate, potassium carbonate, zinc carbonate, and the like.

Also useful as a foaming agent is a mixture of an organic acid and a carbonate. The organic acids can be, for example, stearic acid, palmitic acid, lauric acid, myristic acid, oleic acid, undecylenic acid, phthalic acid, terphthalic acid, isophthalic acid, carboxylic acid, maleic acid, fumaric acid, and the like. Suitable carbonates for the mixture include, for example, ammonium carbonate, sodium carbonate, zinc carbonate, potassium carbonate, and the like.

Also useful is a mixture of a metal nitrite and an ammonium salt. The metal nitrite can be, for example, calcium nitrite, sodium nitrite, potassium nitrite, and the like. Suitable ammonium salts include, for example, ammonium sulfate, ammonium chloride, ammonium nitrate, and the like.

Preferred foaming agents in the present composition are a sulfonylhydrazide, azodicarboxamide, a urea, and sodium bicarbonate.

Plasticizing Agent. The composition further includes an effective amount of an organic plasticizing agent to impart flexibility to the material before, during and after mixing, and to provide flexibility, elasticity, and processability to the formed article. The composition is formulated with about 5–60 parts plasticizer, preferably about 10–50 parts, preferably about 15–40 parts.

Plasticizers that can be used according to the invention, alone or in combination, include low molecular weight hydrophilic organic compounds such as glycerol, ethylene glycol, propylene glycol, 1,4-butanediol, diethylene glycol, triethylene glycol, polyethylene glycols, polypropylene glycols, polyethylene-propylene glycol, sodium cellulose glycolate, sodium diethylsuccinate, triethyl citrate, polyethylene glycol fatty acid esters, glycerol monoacetate, diglycerol, glycerol diacetate or triacetate, diacetin sorbitol, sorbitan, mannitol, maltitol, polyvinyl alcohol, cellulose methyl ether, sodium alginate, sodium diethylsuccinate, 1,2,6-hexanetriol, triethanolamine, and mixtures thereof. Preferred plasticizers are glycerol, propylene glycol, triethyleneglycol and ethylene glycol.

Aqueous medium. The composition further includes an aqueous medium such as water, aqueous alcohol and buffer, with water being preferred. The aqueous medium provides additional wetting, plasticizing and/or lubricating effect in the composition. Preferably, the composition is formulated with about 5–50 parts of an aqueous medium, preferably about 5–20 parts, preferably about 5–10 parts.

Additives. The soy protein-based thermoplastic composition can further include additives as desired. Useful additives include, for example, an additional protein source, a filler/extender, lubricant, coloring agent, bleaching/whitening agent, and preservative.

Protein Source. An additional plant-, animal- or microbe-derived protein source can partially replace the soy protein. The composition can be formulated with about 5–50 parts of a non-soy protein, preferably about 10–35 parts, preferably about 15–25 parts.

Suitable plant-derived proteins include, for example, gluten, zein, hordein, kafirin, avenin, sunflower seed protein, cotton seed protein, peanut protein, rapeseed protein, and the like. Animal-derived proteins suitable for use in the present composition include, for example, casein derived from milk, albumin derived from blood or egg, collagen, gelatin, keratin, and other like protein-containing substances. Microorganisms, such as beer yeast and baker's yeast, among other organisms, can also be combined with the soy protein in the present compositions.

Fillers/Extenders. The composition can also be formulated to contain a filler, preferably a polysaccharide material, to improve flowability, to provide structural reinforcement, to enhance mechanical properties such as tensile strength and yield strength, and to decrease product cost. However, the density of the formed article may be increased by the inclusion of a polysaccharide material which generally decreases expansion of the soy protein composition. The soy protein composition can include about 5–20 parts filler, preferably about 10–15 parts.

The filler can be a native (unmodified) starch isolated from a natural starch source such as corn including maize, waxy maize and high amylose corn; wheat including hard wheat, soft wheat and durum wheat; rice including waxy rice; rye, oat, barley, sorghum, millet, triticale, amaranth, potato, tapioca, mung bean, sweet potato, and the like. The starch can be a normal starch (about 20–30 wt-% amylose), a waxy starch (about 0–8 wt-% amylose), or a high-amylose starch (greater than about 50 wt-% amylose).

The filler can also be a chemically-modified, derivatized starch such as starch acetate, starch propionamide, starch maleate, starch octenylsuccinate, carboxymethyl starch, hydroxyethyl starch, hydroxypropyl starch, methyl starch, ethyl starch, methyl hydroxyethyl starch, ethylhydroxypropyl starch, starch phosphate, oxidized starch, cationic starch, starch succinate, and the like. Also useful as a filler is a pregelatinized starch, a cold water-soluble starch, or other physically modified starch.

Natural and modified gums such as xanthan gum, guar gum, locust bean gum, gum arabic, alginates, carrageenan, pectin, agar, konjac flour, and the like, can also be included as a filler in the composition.

Another useful filler is a cellulosic material, including cellulose derivatives such as methylcellulose, carboxymethylcellulose, hydroxymethylcellulose, hydroxypropylcellulose and sodium carboxymethylcellulose; cellulose acetate, cellulose nitrate.

The extender can also be a synthetic polymer such as a poly(acrylic acid), poly(methacrylic acid), poly(vinyl acetate), poly(vinyl alcohol), poly(vinyl acetate phthalate), ethylene/vinyl acetate copolymer, ethylene/vinyl alcohol copolymer, and polyhydroxybutylate, among others.

Chemical Bleaching/Whitening Agent. The composition can contain a minor but effective amount of a bleaching/whitening agent at about 0.1–10 parts, preferably about 1–5 parts.

Examples of suitable bleaching/whitening agents include sodium bisulfite, sodium silicoaluminate, calcium sulfate, calcium carbonate, barium sulfate, magnesium silicate, calcium silicate, diatomaceous silica, mica, hydrated aluminum oxide, titanium dioxide, zinc oxide, zinc sulfide, lithophone, and the like.

Lubricants. The composition can contain a minor but effective amount of a lubricating agent to provide a mold- or dye-lubricating effect when the composition is molded into the desired article, for example, by aiding in the release of the molded article from the mold. Water-insoluble lubricants can also increase the water-resistance of the products. The amount of lubricant included in the composition can be about 0.1–2 parts, preferably about 0.5–1.5 parts.

Examples of suitable lubricants that can be used in the compositions, either alone or in combination with another lubricant, include vegetable oil, preferably hydrogenated forms; soybean oil; phospholipids such as lecithin, mono- and diglycerides; fatty acids, preferably saturated fatty acids; phosphoric acid-derivatives of the esters of polyhydroxy compounds; animal lipids, preferably hydrogenated forms to prevent thermal oxidation; petroleum silicone; mineral oils; and the like. Preferred lubricants are soybean oil and lecithin.

Colorant. The compositions can further include about 0.1–10 parts of a coloring agent, preferably about 0.5–5 parts. Coloring agents suitable for use in the present compositions include, for example, azo dyes such as Bismarck Brown 2R and Direct Green B; natural coloring agents such as chlorophyll, xanthophyll, carotene, and indigo; and metallic oxides such as iron or titanium oxides.

Preservatives. A compatible antimicrobial agent such as a fungicide or bactericide can also be included in the composition in an amount effective to prevent growth of fungi, bacteria and the like, in or on the compositions or an article formed from the compositions. Examples of useful preservatives include sodium salts of propionic or sorbic acid, sodium diacetate, parabens, vinegar, monocalcium phosphate, lactic acid, and the like, and mixtures thereof. The antimicrobial agent should not induce undesirable interactions or chemical reactions between the components of the composition.

Preparation of Thermoplastic Compositions and Formed Articles. The compositions of the present invention are composed of soy protein at about 100 parts; a foaming agent at about 0.1–20 parts, preferably about 1–10 parts, preferably about 5–8 parts; a plasticizing agent at about 5–60 parts, preferably about 10–50 parts, preferably about 15–40 parts; and an aqueous medium at about 5–20 parts, preferably about 5–15 parts, preferably about 5–10 parts. A preferred composition is made of 100 parts (dry basis) soy protein isolate, 5 parts 4,4'-oxybis(benzenesulfonylhydrazide) (Celogen-OT; Uniroyal Chemical Co., Middlebury, Conn.), and 20 parts glycerol and 20 parts propylene glycol, 20 parts water. Another preferred composition is 100 parts soy protein isolate, 5 parts Celogen-OT, 20 parts propylene glycol, and 10 parts water.

The compositions are prepared by combining and reacting the ingredients together at about 80°–190° C. and about 2–20 ton pressure for about 1–20 minutes to form a molded article or a foamed sheet. The sheet can be thermoformed into various shapes at about 85°–100° C.

After mixing, the protein mixture is discharged from the mixing system, and either directly used in a molding system (i.e., compression molding), or the moisture content can be adjusted to about 25–30% to form a residue for later use. The discharged material (i.e., extrudate) can be sectioned into pellets or other small pieces, and dried. Preferably, the thermoplastic composition has a torque of about 135–2348 m×g, preferably about 200–650 m×g; and a tensile strength of about 0.3–3 MPa, preferably about 0.5–1.5 MPa; and percent elongation of about 20–150% preferably about 50–100%.

The present material has demonstrated excellent biodegradability and water resistance, and can be reused as a soil conditioner. The material can also be produced at a low cost that is competitive with common petroleum-based plastics.

During processing, the composition or residue becomes expanded 2–9 times, preferably about 4–7 times, upon heating. The protein material can be processed into a solid article by any suitable thermoplastic processing method known and used in the art. Preferably, the composition is processed at a temperature of about 80°–190° C., preferably about 130°–160° C., for about 1–10 minutes, preferably for about 3–6 minutes, and at a pressure of about 6–65 MPa, preferably about 20–50 MPa. The composition can be processed by compression molding wherein direct pressure is applied using a hydraulic press on an amount of the composition contained in a cavity; and by injection molding wherein an amount of the plastic composition in melted form is forced into a mold and maintained under pressure until cool. The composition can also be processed by expanded foam molding or extrusion molding.

For example, the composition can be formed into a foamed plastic article by compression molding at about 140° C., about 20 MPa pressure for about 3 minutes. The composition can also be processed into a molded article by injection molding by heating the protein material in the form of solid pellets to a molten state (about 120°–150° C.) having a water content of about 25–30%, and injecting the molten material under pressure of about 880–1700 kg/cm$^2$ and a temperature of about 120°–160° C., into a mold (temperature of about 25°–40° C.). In either case, after the plastic is cooled and solidifies, the injection or compression molding unit is opened and a foamed article having a shape of the mold cavity is obtained. The pellets can also be extruded to form a foamed sheet at about 140°–170° C. (melting zone) and 130°–160° C. (die), and 10–30 rpm. The foamed sheet can then be thermoformed into a shaped article.

The molded plastics are lightweight and light in color which is desirable for consumer products. The composition can be formed into articles of varying shapes, sizes and dimensions, that are useful in a variety of applications. For example, the composition can be molded into a solid article including, for example, dishware such as a plate, and packaging for another article or substance such as foods, drugs and the like, that contain low amounts of water. When contacted with water, the formed articles will absorb water and expand but not readily dissolve.

Advantageously, the present composition can be molded to provide a solid article having a foamed cell structure that is particularly useful for making biodegradable, disposable foamed products similar to styrofoam such as plates, bowls and other dishes, clam-shell containers, structured foam-packaging material, loose-fill packing peanuts, building insulation material, and the like.

The articles formed from the present composition are also useful for providing thermal insulation. Such insulating packaging material can also be made, for example, by laminating the material with paper or other similar sheet material. The material has a high fire resistance and low thermal conductivity. Preferably, the molded articles have a thermal conductivity of about 0.2–0.5 BTU-inch/hour-ft²-°F., preferably about 0.2–0.4 BTU-inch/hour-ft²-°F.

In that regard, it is preferred that the composition is molded to provide an article having a high proportion of closed cells rather than open cells, preferably about 90–95% closed cells, to maintain a low level of thermoconductivity and provide an article with a high degree of thermoinsulating properties. A closed cell structure can be achieved by adjusting the amount of foaming agent, plasticizer and/or water of the composition, and the compression molding conditions such as the use of a low moisture content and short compression molding time. An open cell structure can be achieved by increasing the moisture content of the composition and prolonging the molding time. Preferably, the average (closed) cell diameter is about 10–200 μm, preferably about 40–80 μm.

The products prepared with the soy protein composition display high tensile strength, elongation properties and water resistance. The resulting article preferably has a density of about 0.1–0.5 g/cm³, with about 0.2 g/cm³ being preferred; a tensile strength of about 0.3–3 Mpa, with about 0.6 MPa preferred; and a percent elongation of about 20–150%, with about 30–38% being preferred. The articles have a compressive strength of about 140–300 kPa at 10% compression, preferably about 200–300 kPa; and a compression modulus of about 1.7–4.6 MPa, preferably about 2–4 MPa. The article submerged in water has a 24-hour water absorption of about 90–250 wt-% at about 25° C.

The invention will be further described by reference to the following detailed examples. These examples are not meant to limit the scope of the invention that has been set forth in the foregoing description. It should be understood that many variations and modifications can be made while remaining within the spirit and scope of the invention. The disclosure of the cited references are incorporated by reference herein.

The soy protein-based compositions that are set forth in the following examples were molded into a standard dogbone-shaped article as described in the American Society for Testing and Materials (ASTM D 638-86). Density was measured according to ASTM D1622-88. Tensile properties of the molded articles (i.e., tensile strength at breakage (TS)) were measured according to ASTM standard method D3574-91 using a Instron Testing System (Model 4500, Canton, Mass.). Percent elongation at breakage (PE) was measured according to ASTM D3574-91. Percent water absorption was measured according to ASTM C272-91. Compressive strain at 10% strength was measured according to ASTM B1621-73. Torque was measured according to ASTM-B2538-88. Flammability characteristic was measured according to ASTM D4804-91.

EXAMPLE 1

Molding Temperature

The effect of varying molding temperature on the physical properties of articles formed from a soy protein-based composition was examined as follows.

The composition was formed by mixing 100 parts soy protein isolate with an aqueous solution of 4,4'-oxybis (benzenesulfonylhydrazide) (Celogen-OT, Uniroyal Chemical Co., Middlebury, Conn.) (5 pts), propylene glycol (25 pts), and water (10 pts). The mixture was prepared by spraying the soy protein isolate with the liquid solution while stirring the mixture in a mixing bowl (Mixer K5ss, KitchenAid Portable Appliances, St. Joseph, Mo.) at 25° C. The residue was then ground to a coarse powder in a coffee grinder (KSM2, Braun Inc., Lynnfield, Mass.). The soy protein residue (15.5 grams) was pressed into an ASTM standard dogbone article using an ASTM type I tensile bar mold and a compression molding machine (Model 20-121202TMB), Wabash Metal Products, Inc., Wabash, Ind.) at 32.6 Mpa, for 4 minutes at temperatures that varied from 130° C. to 170° C. The molded articles had a foamed appearance with a closed cell structure similar styrofoam, with an average cell diameter of about 50 μm.

The test results of the molded articles are shown below in Table 1. In general, the compositions molded at a lower temperature had a higher density, higher tensile strength, generally higher percent elongation, and lower percent water absorption. As the temperature increased, the molded article density, tensile strength, and percent elongation at breakage decreased.

From the results shown in Table 1, the preferred molding temperature is 150° C. because the articles had a low density and reasonable tensile strength and percent elongation at the breakage.

TABLE 1

| Mold Temperature (°C.) | Density (g/cc) | TS¹ (Mpa) | PE² (%) | % Water absorp. 2 hrs | % Water absorp. 24 hrs |
|---|---|---|---|---|---|
| 130 | 0.66 | 2.05 | 39.0 | 48 | 93 |
| 140 | 0.45 | 1.41 | 41.4 | 71 | 124 |
| 150³ | 0.18 | 0.63 | 33.3 | 87 | 168 |
| 160 | 0.16 | 0.29 | 20.9 | 181 | 299 |
| 170 | 0.14 | 0.04 | 8.3 | 276 | 400 |

¹TS = Tensile strength at breakage.
²PE = Percent elongation at breakage.
³The thermal conductivity of the 150° C. composition was 0.387 BTU-in/hr-ft²-°F.)

EXAMPLE 2

Molding Pressure

The effect of varying the molding pressure on the physical properties of articles formed from a soy protein-based composition was tested as follows.

Articles were molded from soy protein composition as described in Example 1, except the mold temperature was 150° C., with the mold pressure varied from 19–45 Mpa. The resulting articles had a foamed structure with cells that were closed and about 50 μm diameter. The foamed structure had round-shape and oval-shaped cells divided by a thin wall. The size of the cells varied. The results are shown below in Table 2.

In general, the tensile strength and percent elongation decreased with increasing mold pressure. From these results, the preferred molding pressure is 32.6 MPa because the resulting article had low density and low water absorption.

TABLE 2

| Mold Pressure | Density | TS² | PE³ | % Water absorp. | |
|---|---|---|---|---|---|
| (Mpa)¹ | (g/cc) | (MPa) | (%) | 2 hrs | 24 hrs |
| 19.6 | 0.22 | 0.69 | 39.1 | 97 | 181 |
| 26.1 | 0.21 | 0.64 | 38.1 | 91 | 167 |
| 32.6 | 0.18 | 0.63 | 33.3 | 87 | 168 |
| 39.1 | 0.19 | 0.47 | 24.9 | 92 | 175 |
| 45.7 | 0.21 | 0.47 | 24.8 | 101 | 188 |

¹1 ton = 3.262 MPa
²TS = Tensile strength at breakage.
³PE = Percent elongation.

EXAMPLE 3

Molding Time

The effect of compression molding time on the physical properties of articles formed from a soy protein-based composition was examined as followed.

Articles were prepared and compression molded from the soy protein composition as described in Example 1, except the molding temperature was 150° C., molding pressure was 32.6 MPa, and molding time was varied from 3 to 5 minutes. The articles had a foamed appearance with a closed structure with cells about 10–200 μm diameter. The foamed structure was similar to the articles in Example 2. The results of tests on the molded articles are presented below in Table 3.

In general, the compositions molded for the longer time periods had a lower density, lower tensile strength, lower percent elongation, and higher percent water absorption than compositions molded for shorter periods of time.

From these results, 4 minutes of compression molding at 150° C. and 32.6 MPa pressure was preferred because the resulting article had a low density (0.18), an average tensile strength (0.63 MPa) and percent elongation (33%), and a comparatively low % water absorption (87% at 2 hours; 168% at 24 hours).

TABLE 3

| Mold Time | Density | TS¹ | PE² | % Water absorp. | |
|---|---|---|---|---|---|
| (minutes) | (g/cc) | (MPa) | (%) | 2 hrs | 24 hrs |
| 3 | 0.27 | 1.04 | 34.7 | 83 | 149 |
| 3.5 | 0.23 | 0.87 | 33.7 | 86 | 154 |
| 4 | 0.18 | 0.63 | 33.3 | 87 | 168 |
| 4.5 | 0.18 | 0.47 | 27.2 | 104 | 210 |
| 5 | 0.16 | 0.33 | 20.9 | 125 | 226 |

¹TS = Tensile strength at breakage.
²PE = Percent elongation at breakage.

EXAMPLE 4

Foaming Agents

The effect of different foaming agents on the physical properties of articles formed from a soy protein-based composition was examined as follows.

Compositions were prepared as described in Example 1 by combining soy protein isolate (100 pts) with a liquid solution containing propylene glycol (25 pts), water (10 pts), and one of the following four foaming agents (5 pts): Celogen-OT, Celogen-TSH, Celogen-AZ, and sodium bicarbonate. Articles were prepared from the composition by compression molding at a molding temperature of 150° C., molding pressure of 32.6 MPa, and molding time of 4 minutes. The articles had a foamed appearance with an closed cell structure with cells about 10–250 μm diameter. The foam structure was similar to Example 2. The results are shown below in Table 4.

The preferred foaming agent was Celogen-OT because it had a decomposition temperature at 130°–140° C. which is compatible with the soy protein gelation or melting temperature, gave non-toxic and non-volatile oligomers as by-products and a high gas volume (313 cm³/gm) at decomposition, and had a bleaching effect.

TABLE 4

| Foaming¹ | Density | TS² | PE³ | % Water absorp. | |
|---|---|---|---|---|---|
| Agent | (g/cc) | (MPa) | (%) | 2 hrs | 24 hrs |
| Celogen-OT | 0.18 | 0.63 | 33 | 87 | 168 |
| Celogen-TSH | 0.22 | 0.67 | 88 | 85 | 172 |
| Celogen-AZ | 0.22 | 0.79 | 47 | 110 | 228 |
| sodium bicarbonate | 0.23 | 0.57 | 127 | 134 | 333 |

¹Celogen-OT = 4,4'-oxybis(benzenesulfonylhydrazide).
Celogen-TSH = p-toluenesulfonylhydrazide.
Celogen-AZ = azodicarboxamide.
²TS = Tensile strength at breakage.
³PE = Percent elongation at breakage.

EXAMPLE 5

Foamant Concentration

The effect of varying the concentration of the chemical foaming agent on the physical properties of articles formed from a soy protein-based composition was examined as follows.

Compositions were prepared as described in Example 1, by combining soy protein isolate (100 parts), ethylene glycol (20 parts), water (10 parts), and from 1–9 parts Celogen OT. Articles were prepared from the composition by compression molding as described in Example 4. The articles were a foamed material with closed cells about 10–250 μm diameter. The results are shown below in Table 5.

The preferred composition contained 5 parts Celogen-OT foaming agent. That composition was preferred because the articles produced had acceptable density, tensile strength, percent elongation at breakage, and water absorption.

TABLE 5

| Celogen-OT Amount | Density | TS¹ | PE² | % Water absorp. | |
|---|---|---|---|---|---|
| (pts.) | (g/cc) | (MPa) | (%) | 2 hrs | 24 hrs |
| 1 | 1.04 | 3.90 | 77.8 | 47 | 107 |
| 3 | 0.30 | 1.20 | 51.0 | 103 | 194 |
| 5 | 0.23 | 0.71 | 36.6 | 108 | 198 |
| 7 | 0.17 | 0.40 | 30.0 | 114 | 202 |
| 9 | 0.16 | 0.40 | 19.6 | 101 | 158 |

¹TS = Tensile strength at breakage.
²PE = Percent elongation at breakage.

EXAMPLE 6

Plasticizers

The effect of four different polyol plasticizers on the properties of articles formed from soy protein-based materials was tested as follows.

Compositions were prepared as described in Example 1 by mixing together 100 parts soy protein isolate, 20 parts plasticizer, 5 parts Celogen-OT foaming agent, and 10 parts water. Molding conditions were the same as in Example 4. The four polyol plasticizers tested were: propylene glycol, ethylene glycol, glycerol, and triethylene glycol. The molded articles had a foam structure similar to Example 2. The results of tests on the formed articles are shown below in Table 6.

The preferred plasticizer was propylene glycol because the articles formed had low density and high tensile strength.

TABLE 6

| Plasticizer | Density (g/cc) | TS[1] (MPa) | PE[2] (%) | % Water absorp. 2 hrs | % Water absorp. 24 hrs |
|---|---|---|---|---|---|
| Propylene Glycol | 0.19 | 0.87 | 21.2 | 89 | 191 |
| Ethylene Glycol | 0.23 | 0.71 | 36.6 | 98 | 180 |
| Glycerol | 0.26 | 1.02 | 20.4 | 87 | 152 |
| Triethylene Glycol | 0.30 | 2.06 | 32.3 | 76 | 141 |

[1]TS = Tensile strength at breakage.
[2]PE = Percent elongation at breakage.

EXAMPLE 7

Plasticizer Concentration

The effect of varying the concentration of the plasticizing agent, propylene glycol, on the physical properties of articles molded from soy protein-based compositions was examined as follows.

The compositions were prepared as described in Example 1, by combining together 100 parts soy protein isolate, 5 parts Celogen-OT foaming agent, 10 parts water, and 10–25 parts propylene glycol plasticizer. Molding conditions were the same as in Example 4. The molded articles had a foamed structure that was similar to Example 2. The results of tests on the formed articles are shown below in Table 7.

The preferred amount of plasticizer was 20 parts because the formed articles had low density and acceptable tensile strength.

TABLE 7

| Propylene Glycol (parts) | Density (g/cc) | TS[1] (MPa) | PE[2] (%) | % Water absorp. 2 hrs | % Water absorp. 24 hrs |
|---|---|---|---|---|---|
| 10 | 0.24 | 1.57 | 11.9 | 70 | 130 |
| 15 | 0.23 | 1.25 | 14.3 | 79 | 166 |
| 20 | 0.19 | 0.87 | 21.5 | 89 | 191 |
| 25 | 0.18 | 0.63 | 33.3 | 87 | 168 |

[1]TS = Tensile strength at breakage.
[2]PE = Percent elongation at breakage.

EXAMPLE 8

Water Concentration

The amount of water added to the composition was varied to determine the effect of water concentration of the physical properties of soy protein-based formed articles.

The compositions were prepared as described in Example 1 by mixing together 100 parts soy protein isolate, 20 parts ethylene glycol, 5 parts Celogen-OT foaming agent, and from 5–20 parts water. The molding conditions were the same as in Example 4. The foam structure of the articles was similar to Example 2. These results are shown below in Table 8.

The preferred amount of water was 10 parts because the articles formed at that water concentration had acceptable density, tensile strength, percent elongation, and water absorption.

TABLE 8

| Water (parts) | Density (g/cc) | TS[1] (MPa) | PE[2] (%) | % Water absorp. 2 hrs | % Water absorp. 24 hrs |
|---|---|---|---|---|---|
| 5 | 0.34 | 1.28 | 38.7 | 69 | 127 |
| 10 | 0.23 | 0.71 | 36.6 | 86 | 168 |
| 15 | 0.20 | 0.43 | 36.5 | 150 | 266 |
| 20 | 0.20 | 0.37 | 33.1 | 201 | 279 |

[1]TS = Tensile strength at breakage.
[2]PE = Percent elongation at breakage.

EXAMPLE 9

Fillers

The effect of adding fillers to the soy protein compositions was examined as follows. Compositions were prepared as described in Example 1. A control composition was made without a filler by combining 100 parts soy protein isolate, 25 parts propylene glycol plasticizer, and 5 parts Celogen-OT foaming agent. Three test compositions were prepared with the fillers gelatin, cellulose, and modified cellulose as shown below in Table 9. Molding conditions were the same as in Example 4.

The molded articles had a foamed appearance that was not fully expanded, and had a yellowish color and rough surface. This product had inferior properties compared to those articles made without a filler. The results of tests on the molded articles are presented in Table 9 below.

TABLE 9

| | Soy protein isolate (parts) | Propyl.[1] glycol | Celogen-OT | Filler | Density (g/cc) | TS[2] (MPa) | PE[3] (%) | % Water absorp. 2 hrs | % Water absorp. 24 hrs |
|---|---|---|---|---|---|---|---|---|---|
| Control | 100 | 25 | 5 | — | 0.18 | 0.63 | 33.3 | 87 | 168 |
| 1 | 50 | 25 | 5 | 50 (protein) | 0.29 | 0.47 | 26.7 | 78 | 118 |

TABLE 9-continued

| | Soy protein isolate (parts) | Propyl.[1] glycol | Celogen-OT | Filler | Density (g/cc) | TS[2] (MPa) | PE[3] (%) | % Water absorp. 2 hrs | 24 hrs |
| --- | --- | --- | --- | --- | --- | --- | --- | --- | --- |
| 2 | 60 | 25 | 5 | 40 (cellulose) | 0.65 | 0.70 | 16.0 | 105 | 168 |
| 3 | 60 | 25 | 5 | 40 (mod. cellul.)[4] | 0.74 | 0.74 | 20.0 | 73 | 208 |

[1]Propyl. glycol = propylene glycol.
[2]TS = Tensile strength at breakage.
[3]PE = Percent elongation at breakage.
[4]mod. cellul. = modified cellulose.

EXAMPLE 10

Bleaching Agent

The effects of adding a bleaching agent on the soy protein-based composition was tested as follows.

The bleaching agents were calcium carbonate, titanium oxide, zinc oxide, and sodium bisulfate. A control composition was prepared without a bleaching agent by combining 100 parts soy protein isolate, 25 parts propylene glycol, 5 parts Celogen-OT foaming agent, and 10 parts water. Test compositions were prepared with the same ingredients and amounts as the control with the addition of 5 parts bleaching agent, except sodium bisulfite was added at 0.3 parts. Molding conditions were the same as in Example 4. The molded articles had a foamed appearance that had a smooth surface and whiter color. The results of tests on the molded articles are presented in Table 10 below.

The compositions made with titanium oxide were preferred because it gave acceptable density and high tensile strength. The formed article also had a relatively low water absorption after soaking in water.

TABLE 10

| Bleaching Agent[1] | Density (g/cc) | TS[2] (MPa) | PE[3] (%) | % Water absorp. 2 hrs | 24 hrs |
| --- | --- | --- | --- | --- | --- |
| Control | 0.18 | 0.66 | 33.3 | 87 | 168 |
| Calcium Carbonate | 0.20 | 0.45 | 56.5 | 116 | 271 |
| Titanium Oxide | 0.24 | 0.89 | 61.8 | 76 | 168 |
| Zinc Oxide | 0.24 | 0.89 | 47.0 | 79 | 197 |
| Sodium Bisulfite | 0.31 | 0.45 | 26.1 | 150 | 192 |

[1]Control had no bleaching agent. Test compositions contained 5 parts bleaching agent, except sodium bisulfite was added at 0.3 parts.
[2]TS = Tensile strength at breakage.
[3]PE = Percent elongation at breakage.

EXAMPLE 11

Protein Additive (Gluten)

The addition of a non-soy protein, gluten, was tested as follows.

The composition was prepared as described in Example 1, by reacting together 50 parts soy protein isolate and 50 parts gluten with a solution containing 5 parts Celogen-OT foaming agent, 25 parts propylene glycol, and 10 parts water. Molding conditions were the same as in Example 4. The molded articles had a foamed appearance that had a light yellowish color and rubbery texture. The results of tests on the molded articles are presented in Table 11 below.

TABLE 11

| | Soy Protein Isolate (parts) | Filler (gluten) (parts) | Density (g/cc) | TS[1] (MPa) | PE[2] (%) | % Water absorp. 2 hrs | 24 hrs |
| --- | --- | --- | --- | --- | --- | --- | --- |
| Control | 100 | 0 | 0.18 | 0.66 | 33.3 | 87 | 162 |
| 1 | 50 | 50 | 0.29 | 0.47 | 26.7 | 78 | 118 |

[1]TS = Tensile strength at breakage.
[2]PE = Percent elongation at breakage.

EXAMPLE 12

Filler Additive (Corn starch)

The addition of a polysaccharide filler, corn starch, was tested as follows.

The composition was prepared as described in Example 1, by reacting together 60 parts soy protein isolate and 40 parts corn starch with a solution containing 5 parts Celogen-OT foaming agent, 25 parts propylene glycol, and 10 parts water. Molding conditions were the same as in Example 4. The molded articles had a foamed appearance that had a yellowish color and hard texture. The results of tests on the molded articles are presented in Table 12 below.

TABLE 12

| | Soy Protein Isolate (parts) | Filler (corn starch) (parts) | Density (g/cc) | TS[1] (MPa) | PE[2] (%) | % Water absorp. 2 hrs | 24 hrs |
| --- | --- | --- | --- | --- | --- | --- | --- |
| Control | 100 | 0 | 0.18 | 0.66 | 33.3 | 87 | 162 |
| 1 | 60 | 40 | 0.65 | 0.70 | 16.0 | 105 | 168 |

[1]TS = Tensile strength at breakage.
[2]PE = Percent elongation at breakage.

What is claimed is:

1. A biodegradable, soy protein-based thermoplastic composition, comprising the reaction mixture of:

(a) about 50–100 parts by weight soy protein;

(b) about 0.1–10 parts by weight of a sulfonylhydrazide foaming agent;

(c) about 5–60 parts by weight organic plasticizing agent; and (d) about 5–20 parts by weight water;

the composition being a moldable, biodegradable thermoplastic composition having a foamed, cellular structure when molded into an article.

2. The thermoplastic composition according to claim 1, wherein the soy protein is a soy protein concentrate, soy protein isolate, or a combination thereof.

3. The thermoplastic composition according to claim 1, wherein the sulfonylhydrazide foaming agent is a compound selected from the group consisting of benzosulfonylhydrazide, p-toluenesulfonylhydrazide, 4,4'-oxybis(benzenesulfonylhydrazide), bis(hydrozosulfonyl) benzene, 4,4'-bis(hydrozosulfonyl) biphenylhydrazide, and diphenylsulfone-3,3-disulfonyl-hydrazide.

4. The thermoplastic composition according to claim 1, wherein the plasticizing agent is selected from the group consisting of glycerol, ethylene glycol, propylene glycol, 1,4-butanediol, diethylene glycol, triethylene glycol, polyethylene glycol, polypropylene glycol, polyethylene-propylene glycol, sodium cellulose glycolate, sodium diethylsuccinate, triethyl citrate, polyethylene glycol fatty acid esters, glycerol monoacetate, diglycerol, glycerol diacetate or triacetate, diacetin sorbitol, sorbitan, mannitol, maltitol, polyvinyl alcohol, cellulose methyl ether, sodium alginate, sodium diethylsuccinate, 1,2,6-hexanetriol, and triethanolamine.

5. The thermoplastic composition according to claim 1, further comprising a protein additive selected from the group consisting of gluten, zein, hordein, kafirin, avenin, cotton seed, peanut, rapeseed, and sunflower seed.

6. The thermoplastic composition according to claim 1, further comprising a protein additive selected from the group consisting of collagen, casein, albumin, gelatin, and keratin.

7. The thermoplastic composition according to claim 1, further comprising a filler, lubricant, colorant, bleaching/whitening agent, or a combination thereof.

8. The thermoplastic composition according to claim 7, wherein the filler is a polysaccharide material selected from the group consisting of native starch, chemically-modified starch, physically-modified starch, gum, and cellulosic extender.

9. The thermoplastic composition according to claim 7, wherein the filler is a synthetic polymer selected from the group consisting of poly(acrylic acid), poly(methacrylic acid), poly(vinyl acetate), poly(vinyl alcohol), poly(vinyl acetate phthalate), ethylene/vinyl acetate copolymer, ethylene/vinyl alcohol copolymer, and polyhydroxybutylate.

10. A biodegradable article formed from the thermoplastic composition according to claim 1, the article having a foamed, cellular structure.

11. The article according to claim 10, having a density of about 0.1–0.5 g/cm$^3$.

12. The article according to claim 10, wherein the cell structure is about 90–95% closed cell, and the average cell diameter is about 40–80 μm.

13. The article according to claim 12, having a thermal conductivity of about 0.2–0.5 BTU-inch/hour-ft$^2$-°F.

14. The article according to claim 10, wherein the article when submerged in water has a 24-hour water absorption at about 25° C. wherein the article expands by about 90–250 wt %.

15. A method of making a biodegradable, thermoplastic article, comprising:
 (a) combining together to form a reaction mixture:
  (i) about 50–100 parts by weight soy-based protein;
  (ii) about 0.1–20 parts by weight of a sulfonylhydrazide foaming agent;
  (iii) about 5–60 parts by weight plasticizing agent; and
  (iv) about 5–20 parts by weight water;
 (b) processing the mixture to form a molded article having a foamed, cellular structure.

16. The method according to claim 15, wherein the mixture is processed at a molding temperature of about 80°–190° C., for about 1–7 minutes, at a pressure of about 6–65 Mpa.

17. The method according to claim 16, wherein the mixture is processed by compression molding, injection molding, expanded foam molding, or extrusion molding.

18. A thermoplastic article formed according to the method of claim 15.

* * * * *